US009113143B2

(12) United States Patent
Seow et al.

(10) Patent No.: US 9,113,143 B2
(45) Date of Patent: Aug. 18, 2015

(54) DETECTING AND RESPONDING TO AN OUT-OF-FOCUS CAMERA IN A VIDEO ANALYTICS SYSTEM

(71) Applicant: BEHAVIORAL RECOGNITION SYSTEMS, Inc., Houston, TX (US)

(72) Inventors: Ming-Jung Seow, Houston, TX (US); Dennis G. Urech, Katy, TX (US)

(73) Assignee: BEHAVIORAL RECOGNITION SYSTEMS, INC., Houston, TX (US)

( * ) Notice: Subject to any disclaimer, the term of this patent is extended or adjusted under 35 U.S.C. 154(b) by 225 days.

(21) Appl. No.: 13/930,958

(22) Filed: Jun. 28, 2013

(65) Prior Publication Data

US 2014/0015984 A1 Jan. 16, 2014

Related U.S. Application Data

(60) Provisional application No. 61/666,601, filed on Jun. 29, 2012.

(51) Int. Cl.
*G06K 9/00* (2006.01)
*H04N 17/00* (2006.01)
*G06T 7/00* (2006.01)
*H04N 5/235* (2006.01)

(52) U.S. Cl.
CPC ............ *H04N 17/002* (2013.01); *G06T 7/0081* (2013.01); *G06T 7/0085* (2013.01); *G06T 2207/10016* (2013.01); *G06T 2207/20144* (2013.01)

(58) Field of Classification Search
USPC ......... 382/100, 103, 106–107, 154, 155, 162, 382/168, 173, 181, 199, 224, 232, 254–260, 382/274–276, 286, 291, 305, 312, 248; 348/222.1
See application file for complete search history.

(56) References Cited

U.S. PATENT DOCUMENTS 4,679,077 A 7/1987 Yuasa et al.
5,113,507 A 5/1992 Jaeckel (Continued)

FOREIGN PATENT DOCUMENTS

WO 2009049314 A2 4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Seyed Azarian
(74) *Attorney, Agent, or Firm* — Patterson & Sheridan LLP

(57) ABSTRACT

Techniques are disclosed for detecting an out-of-focus camera in a video analytics system. In one embodiment, a preprocessor component performs a pyramid image decomposition on a video frame captured by a camera. The preprocessor further determines sharp edge areas, candidate blurry edge areas, and actual blurry edge areas, in each level of the pyramid image decomposition. Based on the sharp edge areas, the candidate blurry edge areas, and actual blurry edge areas, the preprocessor determines a sharpness value and a blurriness value which indicate the overall sharpness and blurriness of the video frame, respectively. Based on the sharpness value and the blurriness value, the preprocessor further determines whether the video frame is out-of-focus and whether to send the video frame to components of a computer vision engine and/or a machine learning engine.

17 Claims, 5 Drawing Sheets

(56) References Cited

U.S. PATENT DOCUMENTS 5,748,775 A 5/1998 Tsuchikawa et al.
5,751,378 A 5/1998 Chen et al.
5,969,755 A 10/1999 Courtney
6,252,974 B1 6/2001 Martens et al.
6,263,088 B1 7/2001 Crabtree et al.
6,570,608 B1 5/2003 Tserng
6,661,918 B1 12/2003 Gordon et al.
6,674,877 B1 1/2004 Jojic et al.
6,678,413 B1 1/2004 Liang et al.
6,856,249 B2 2/2005 Strubbe et al.
6,940,998 B2 9/2005 Garoutte
7,076,102 B2 7/2006 Lin et al.
7,136,525 B1 11/2006 Toyama et al.
7,158,680 B2 1/2007 Pace
7,200,266 B2 4/2007 Ozer et al.
7,227,893 B1 6/2007 Srinivasa et al.
7,436,887 B2 10/2008 Yeredor et al.
7,825,954 B2 11/2010 Zhang et al.
7,868,912 B2 1/2011 Venetianer et al.
2003/0107650 A1 6/2003 Colmenarez et al.
2003/0228058 A1 12/2003 Xie et al.
2004/0151342 A1 8/2004 Venetianer et al.
2005/0001759 A1 1/2005 Khosla
2005/0105765 A1 5/2005 Han et al.
2005/0240629 A1 10/2005 Gu et al.
2006/0018516 A1 1/2006 Masoud et al.
2006/0138338 A1 6/2006 Tezuka et al.
2006/0165386 A1 7/2006 Garoutte
2006/0190419 A1 8/2006 Bunn et al.
2006/0193516 A1 8/2006 Toyama et al.
2006/0210186 A1* 9/2006 Berkner ........................ 382/248
2006/0222206 A1 10/2006 Garoutte
2007/0250898 A1 10/2007 Scanlon et al.
2008/0002856 A1 1/2008 Ma et al.
2008/0013861 A1* 1/2008 Li et al. ......................... 382/286
2008/0181453 A1* 7/2008 Xu et al. ....................... 382/103
2008/0181499 A1 7/2008 Yang et al.
2008/0186390 A1* 8/2008 Sato et al. .................. 348/222.1
2008/0193010 A1 8/2008 Eaton et al.
2008/0240496 A1 10/2008 Senior
2008/0247599 A1 10/2008 Porikli et al.
2008/0252723 A1 10/2008 Park
2009/0022364 A1 1/2009 Swaminathan et al.
2009/0067716 A1* 3/2009 Brown et al. ................. 382/173
2009/0210367 A1 8/2009 Armstrong et al.
2009/0297023 A1 12/2009 Lipton et al.
2009/0324107 A1 12/2009 Walch
2010/0063949 A1 3/2010 Eaton et al.
2010/0150471 A1 6/2010 Cobb et al.
2010/0322516 A1 12/2010 Xu et al.

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

A

B

DETECTING AND RESPONDING TO AN OUT-OF-FOCUS CAMERA IN A VIDEO ANALYTICS SYSTEM

CROSS-REFERENCE TO RELATED APPLICATIONS

This application claims priority to U.S. provisional application having Ser. No. 61/666,601, filed on Jun. 29, 2012, which is hereby incorporated by reference in its entirety.

BACKGROUND OF THE INVENTION

1. Field of the Invention

Embodiments of the invention provide techniques for analyzing a sequence of video frames. More particularly, to analyzing and learning behavior based on streaming video data while detecting and responding to out-of-focus video data.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event).

Cameras used in video surveillance systems may provide out-of-focus video frames under various conditions (e.g., when an object appears too close to the camera). Such out-of-focus video frames may negatively affect the video surveillance system's operation, including its ability to distinguish foreground objects in the scene. For example, if a background is used to distinguish foreground objects and the background is updated over time based on a video frame stream, out-of-focus frames may cause the video surveillance system to use an incorrect background to distinguish foreground objects.

SUMMARY OF THE INVENTION

One embodiment provides a method for detecting an out-of-focus camera in a video analytics system. The method may generally include receiving a video frame and performing a pyramid image decomposition on the video frame. The method may also include determining sharp edge areas, candidate blurry edge areas, and blurry edge areas in each level of the pyramid image decomposition. The method may further include determining a sharpness value indicating an overall sharpness of the video frame based on at least the sharp edge areas, and determining a blurriness value indicating an overall blurriness of the video frame based on at least the blurry edge areas and the candidate blurry edge areas. In addition, the method may include determining, based on the sharpness value and the blurriness value, whether the video frame is out-of-focus.

Other embodiments include a computer-readable medium that includes instructions that enable a processing unit to implement one or more embodiments of the disclosed method as well as a system configured to implement one or more embodiments of the disclosed method.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
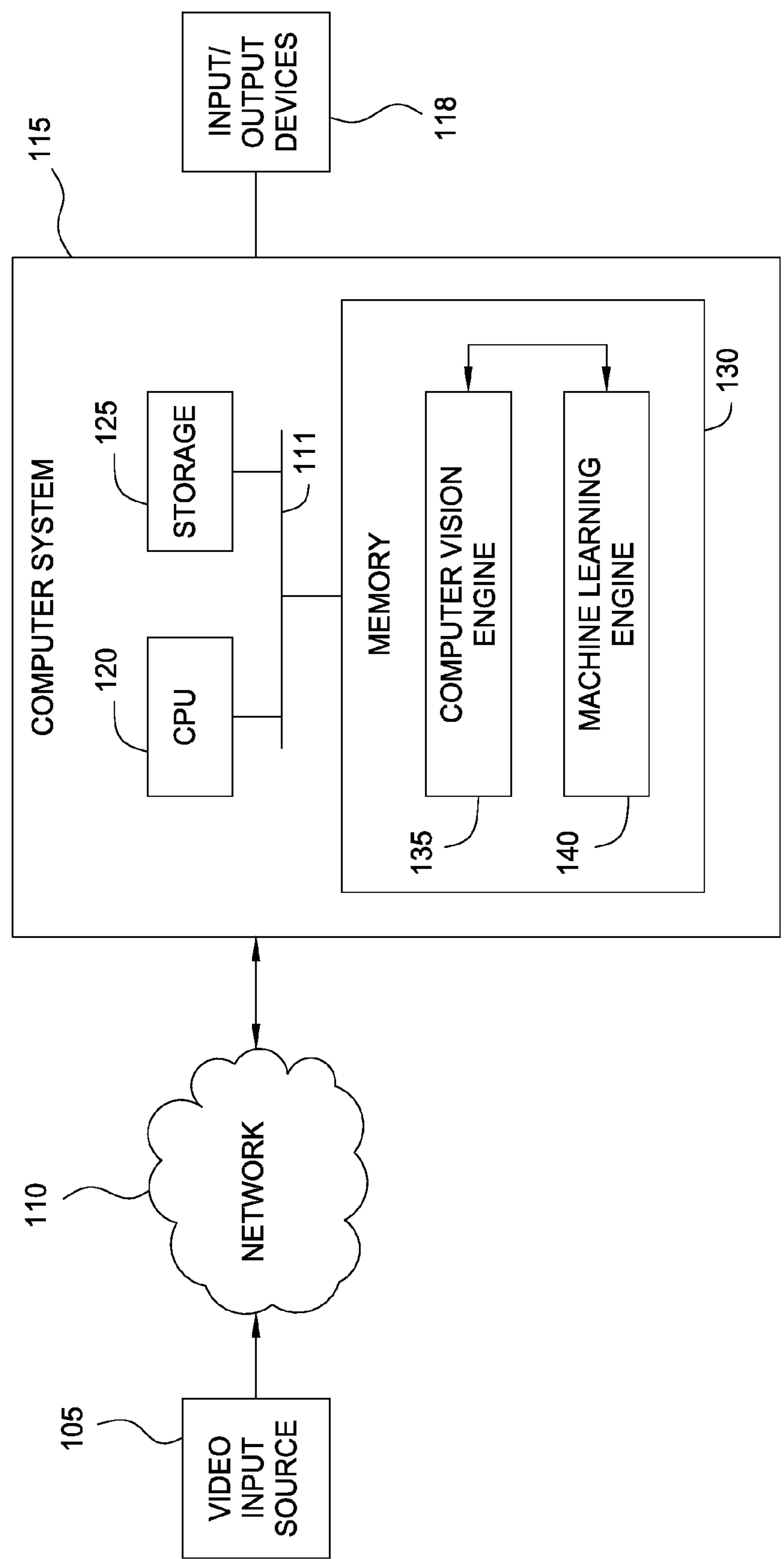
FIG. 1 illustrates components of a video analysis system, according to one embodiment of the invention.

Embodiments of the present invention provide techniques for analyzing and learning behavior based on an acquired stream of video frames. Behavioral recognition may include a computer vision engine used to observe a scene, generate information streams of observed activity, and a machine learning engine used to analyze the streams. The machine learning engine may engage in an undirected and unsupervised learning approach to learn patterns regarding the object behaviors in that scene. Thereafter, when unexpected (i.e., abnormal or unusual) behavior is observed, alerts may be generated.

In addition, the computer vision engine may include a preprocessor component which is configured to detect and respond to an out-of-focus camera. In one embodiment, the preprocessor component may perform a multi-level Haar wavelet transform on a video frame captured by the camera. The preprocessor component may further determine, using the pyramid decomposition generated by the wavelet transform, sharp edge areas, candidate blurry edge areas, and actual blurry edge areas, in the video frame. Based on the sharp edge areas, the candidate blurry edge areas, and actual blurry edge areas, the preprocessor may determine a sharpness value and a blurriness value which indicate the overall sharpness and blurriness of the video frame, respectively. Based on the sharpness value and the blurriness value, the preprocessor further determines whether the video frame is out-of-focus and whether to send the video frame to components of a computer vision engine and/or a machine learning engine.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 which includes both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. In particular, the machine learning engine may model the kinematic properties of one or more types of objects.

In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 may analyze each frame in real-time to derive a set of appearance and kinematic data related to objects observed in the frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
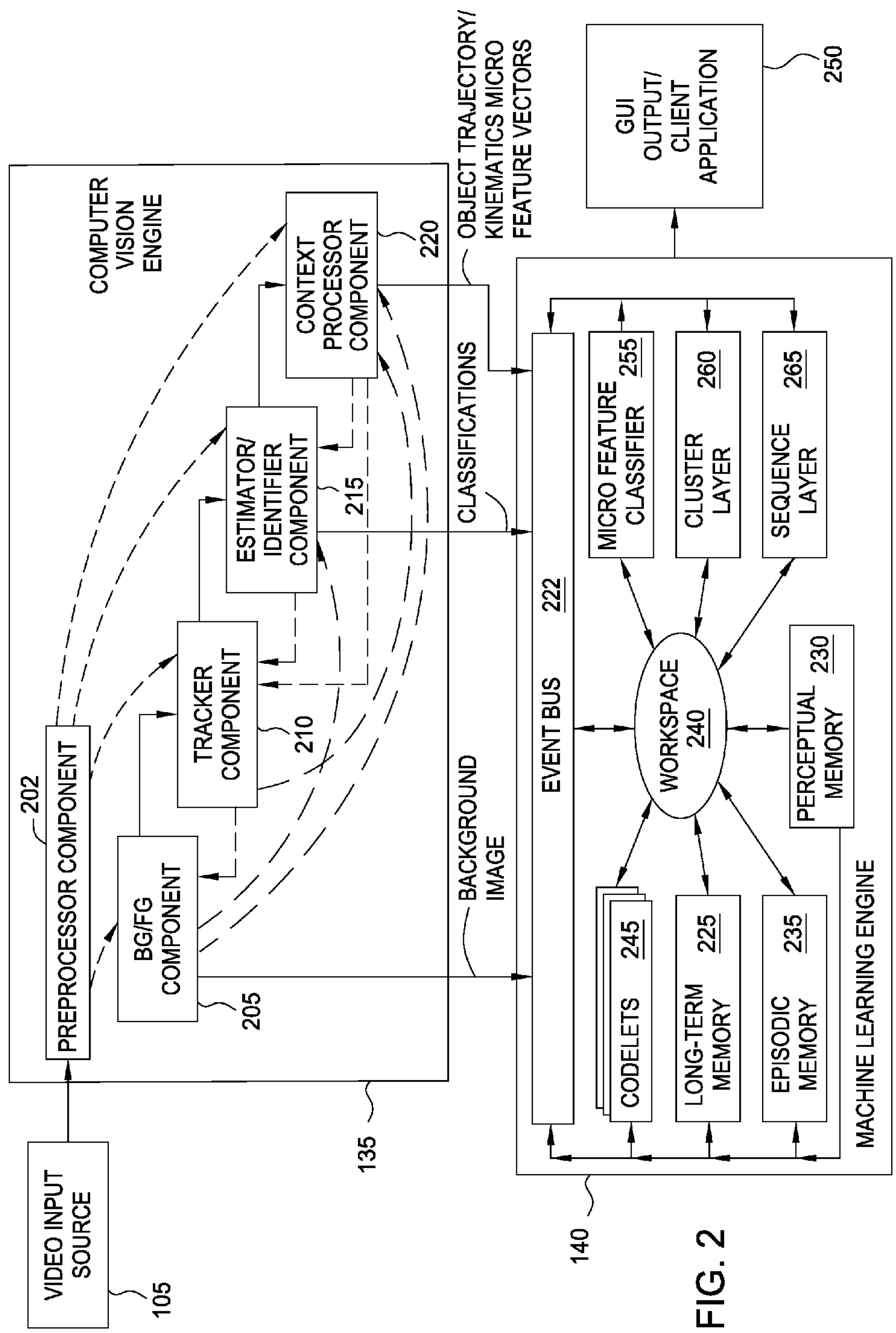
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a preprocessor 202, a background/foreground (BG/FG) component 205, a tracker component 210, an estimator/identifier component 215, and a context processor component 220. Collectively, the components 202, 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 202, 205, 210, 215, and 220 may each provide a software module configured to provide the functions described herein. Of course one of ordinary skill in the art will recognize that the components 202, 205, 210, 215, and 220 may be combined (or further subdivided) to suit the needs of a particular case and further that additional components may be added (or some may be removed).

In one embodiment, the preprocessor component 202 may be configured to determine whether each frame of video provided by the video input source is in or out of focus, as discussed in greater detail below. To not corrupt a scene background model generated by the BG/FG component 205, discussed below, the preprocessor component 202 may send to the BG/FG component 205 frames determined to be in-focus. Similarly, the preprocessor component 202 may send in-focus frames to the tracker component 210, the estimator/identifier component 215, and context processor component 220. In some cases, the preprocessor component 202 may issue an alert when a video frame (or a sequence of video frames) is out of focus.

In one embodiment, the BG/FG component 205 may separate each frame of video provided by the preprocessor 202 into a static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Additionally, pixels classified as depicting scene background maybe used to generate a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and identify a variety of kinematic and/or appearance features of a foreground object, e.g., size, height, width, and area (in pixels), reflectivity, shininess rigidity, speed velocity, etc.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro-feature vectors and kinematic observations of an object and output this to the machine-learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro-feature classifier 255, a cluster layer 260 and a sequence layer 265. Additionally, the machine-learning engine 140 includes a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different event streams from the event bus 222. For example, the micro-feature classifier 255 may subscribe to receive the micro-feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. Each codelet 245 may be a software program configured to evaluate different sequences of events and to determine how one sequence may follow (or otherwise relate to) another (e.g., a finite state machine). More generally, each codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related to an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles in certain areas of the scene tend to be in motion," "vehicles tend to stop in certain areas of the scene," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro-feature classifier 255 may schedule a codelet 245 to evaluate the micro-feature vectors output by the computer vision engine 135. As noted, the computer vision engine 135 may track objects frame-to-frame and generate micro-feature vectors for each foreground object at a rate of, e.g., 5 Hz. In one embodiment, the micro-feature classifier 255 may be configured to create clusters from this stream of micro-feature vectors. For example, each micro-feature vector may be supplied to an input layer of the ART network (or a combination of a self organizing map (SOM) and ART network used to cluster nodes in the SOM). In response, the ART network maps the micro-feature vector to a cluster in the ART network and updates that cluster (or creates a new cluster if the input micro-feature vector is sufficiently dissimilar to the existing clusters). Each cluster is presumed to represent a distinct object type, and objects sharing similar micro-feature vectors (as determined using the choice and vigilance parameters of the ART network) may map to the same cluster.

For example, the micro-features associated with observations of many different vehicles may be similar enough to map to the same cluster (or group of clusters). At the same time, observations of many different people may map to a different cluster (or group of clusters) than the vehicles cluster. Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro-feature classifier 255 may assign an object type identifier to each cluster, providing a different object type for each cluster in the ART network.

In an alternative embodiment, rather than generate clusters from the micro-features vector directly, the micro-feature classifier 255 may supply the micro-feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As noted above, behavioral recognition may include a computer vision engine used to observe a scene, generate information streams of observed activity, and a machine learning engine used to analyze the streams. The machine learning engine may engage in an undirected and unsupervised learning approach to learn patterns regarding the object behaviors in that scene. Thereafter, when unexpected (i.e., abnormal or unusual) behavior is observed, alerts may be generated.

In addition, the computer vision engine may include a preprocessor component which is configured to detect and respond to an out-of-focus camera. In one embodiment, the preprocessor component may perform a multi-level Haar wavelet transform on a video frame captured by the camera. The preprocessor component may further determine, using the pyramid decomposition generated by the wavelet transform, sharp edge areas, candidate blurry edge areas, and actual blurry edge areas, in the video frame. Based on the sharp edge areas, the candidate blurry edge areas, and actual blurry edge areas, the preprocessor may determine a sharpness value and a blurriness value which indicate the overall sharpness and blurriness of the video frame, respectively. Based on the sharpness value and the blurriness value, the preprocessor further determines whether the video frame is out-of-focus and whether to send the video frame to components of a computer vision engine and/or a machine learning engine.

Figure 3:
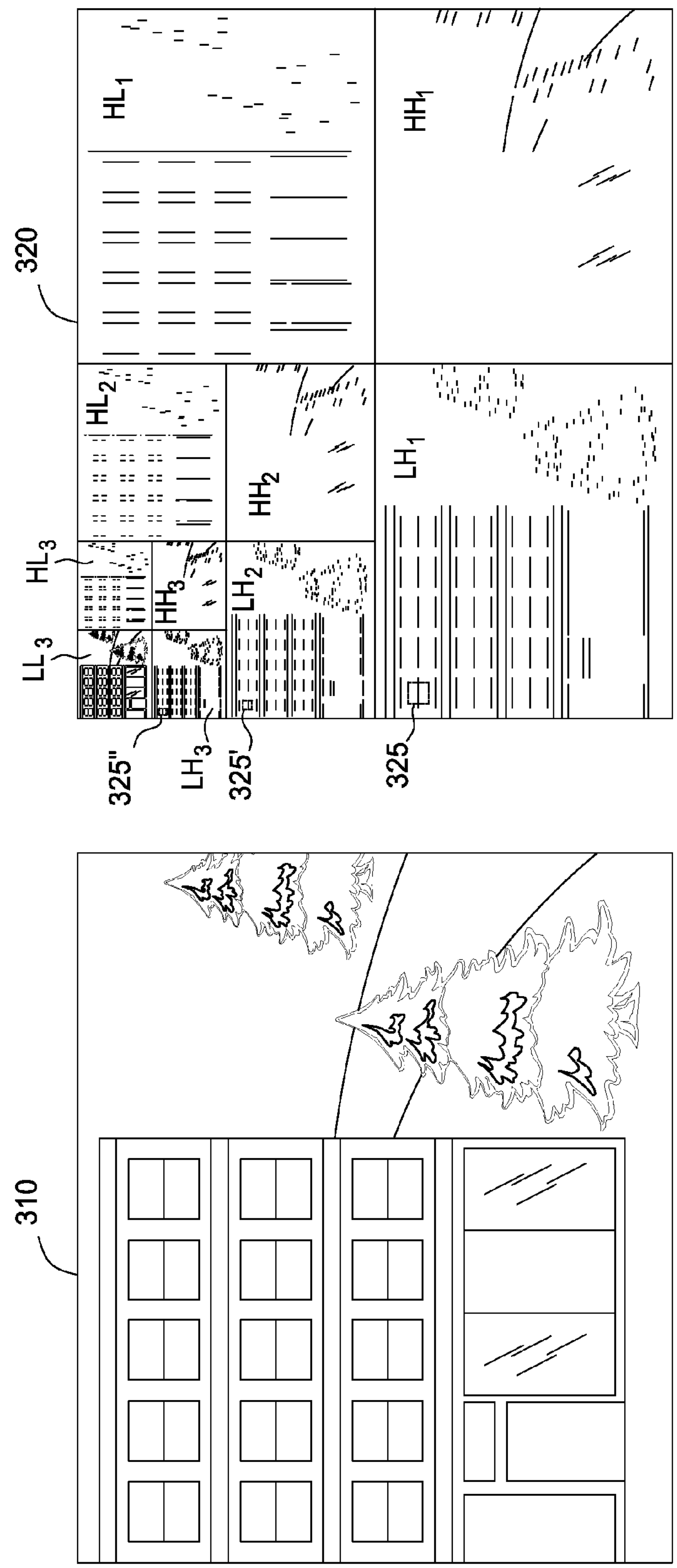
FIG. 3 illustrates an example video frame and a corresponding three-level Haar wavelet transform, according to one embodiment of the invention.

FIG. 3 illustrates an example video frame and a corresponding three-level Haar wavelet transform, according to one embodiment of the invention. Panel A depicts the example video frame 310, which includes a building, a road, and trees. Panel B shows a pyramid image decomposition created by performing a three-level Haar wavelet transform on the example video frame 310. Haar wavelet transform is a well-known wavelet transform which cross-multiplies a given function against the Haar wavelet with various shifts and stretches.

As shown in Panel B, the three-level Haar wavelet transform produces ten images: three first-level images $LH_1$, $HL_1$, and $HH_1$; three second-level images $LH_2$, $HL_2$, and $HH_2$; and four third-level images $LL_3$, $LH_3$, $HL_3$, and $HH_3$. Here, $HH_i$ denotes a horizontal high-pass/vertical high-pass, $HL_i$ denotes a horizontal high-pass/vertical low-pass, $LH_i$ denotes a horizontal low-pass/vertical high-pass and $LL_i$ is iteratively split. As shown, the $HH_i$ images include diagonal details (i.e., diagonal edges) of the scene, the $HL_i$ images include horizontal details (i.e., horizontal edges) of the scene, the $LH_i$ images include vertical details (i.e., vertical edges) of the scene. In addition, each of the images in a level is generated based on a decomposition of the video frame 310 to a given scale using Haar transformation (e.g., ¼ the size of the video frame 310 for the first level, etc.). For a 320×240 video frame, 10 images may be produced. Similarly, for a 640×480 video frame, 13 images may be produced.

In general, the details of an image (e.g., $HL_i$) at one decomposition level may be absent from (or different in) a corresponding image (e.g., $HL_{i+1}$) at a different decomposition level. In one embodiment, only edges appearing in all decomposition levels are considered actual edges, as discussed in greater detail below.

Panel B further shows edge areas 325, 325', and 325" in images $LH_1$, $LH_2$, and $LH_3$, respectively. As shown, the edge areas encompass a horizontal edge of the video frame 310 which is depicted in each of the images $LH_1$, $LH_2$, and $LH_3$. In general, each edge area may be of a predefined size, and an edge area may be determined based on an edge appearing in one or more pyramid decomposition images. For example, the video frame may simply be divided into a plurality of areas (e.g., boxes $2^{highest\,pyramid\,level} \times 2^{highest\,pyramid\,level}$ pixels in size), and those areas which include horizontal, vertical, or diagonal detail from the pyramid decomposition may be considered edge areas.

Figure 4:
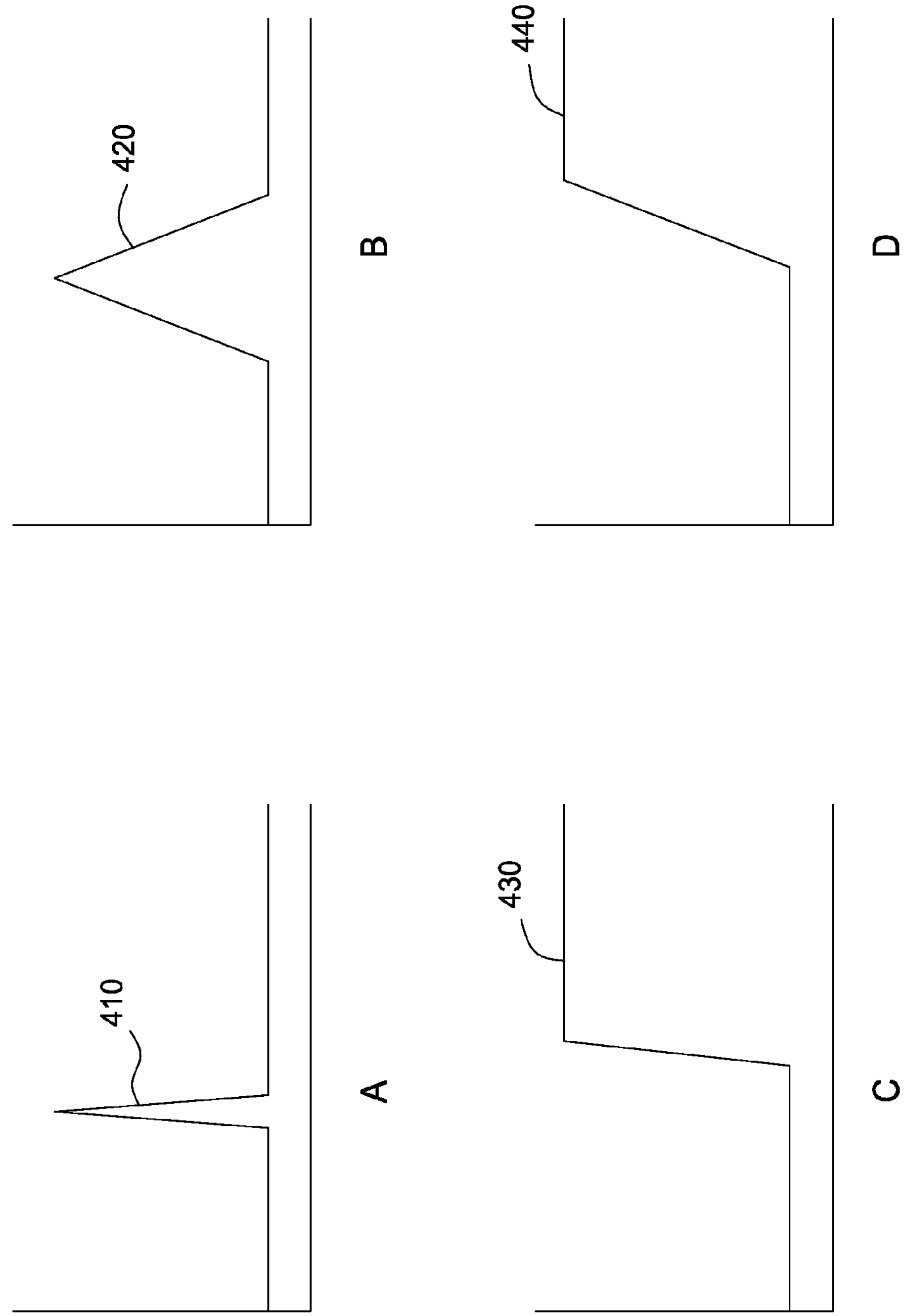
FIG. 4 illustrates a method for detecting and responding to out-of-focus video frames in a video analysis system, according to one embodiment of the invention.

In one embodiment, an edge area may be classified by the preprocessing component as "sharp" or "blurry" based on the type of edge(s) in it. Here, the processing component may classify an edge as "blurry" if it has a roof or Gstep structure, which tend to be associated with blurry edges. By contrast, the processing component may classify an edge as "sharp" if it has a Dirac or Astep structure, which tend to be associated with sharp edges. FIG. 4 illustrates examples of a Dirac structure 410, a roof structure 420, an Astep structure 430, and a Gstep structure 440. The Dirac 410 and roof 420 structures are well-known. The Astep 430 and Gstep 440 structures are step structures, with the change of intensity generally more abrupt in the Astep structure 430 than in the Gstep structure 440. For example, a threshold may be used to distinguish between gradual and abrupt changes in intensity and thereby classify edges as having Astep or Gstep structures.

In one embodiment, the preprocessor may classify each edge area as sharp, blurry, or neither. The preprocessor may then determine a sharpness value indicating overall sharpness for the video frame based on the ratio of sharp edge areas to overall edge areas. Further, the preprocessor may determine a blurriness value indicating overall blurriness for the video frame based on a ratio of the blurry areas and candidate blurry areas, which may include areas encompassing roof and Gstep structures. Based on at least the sharpness and blurriness values, the preprocessor may determine whether to send the video frame to the BG/FG model, tracker component, etc. for further processing, as discussed in greater detail below.

Figure 5:
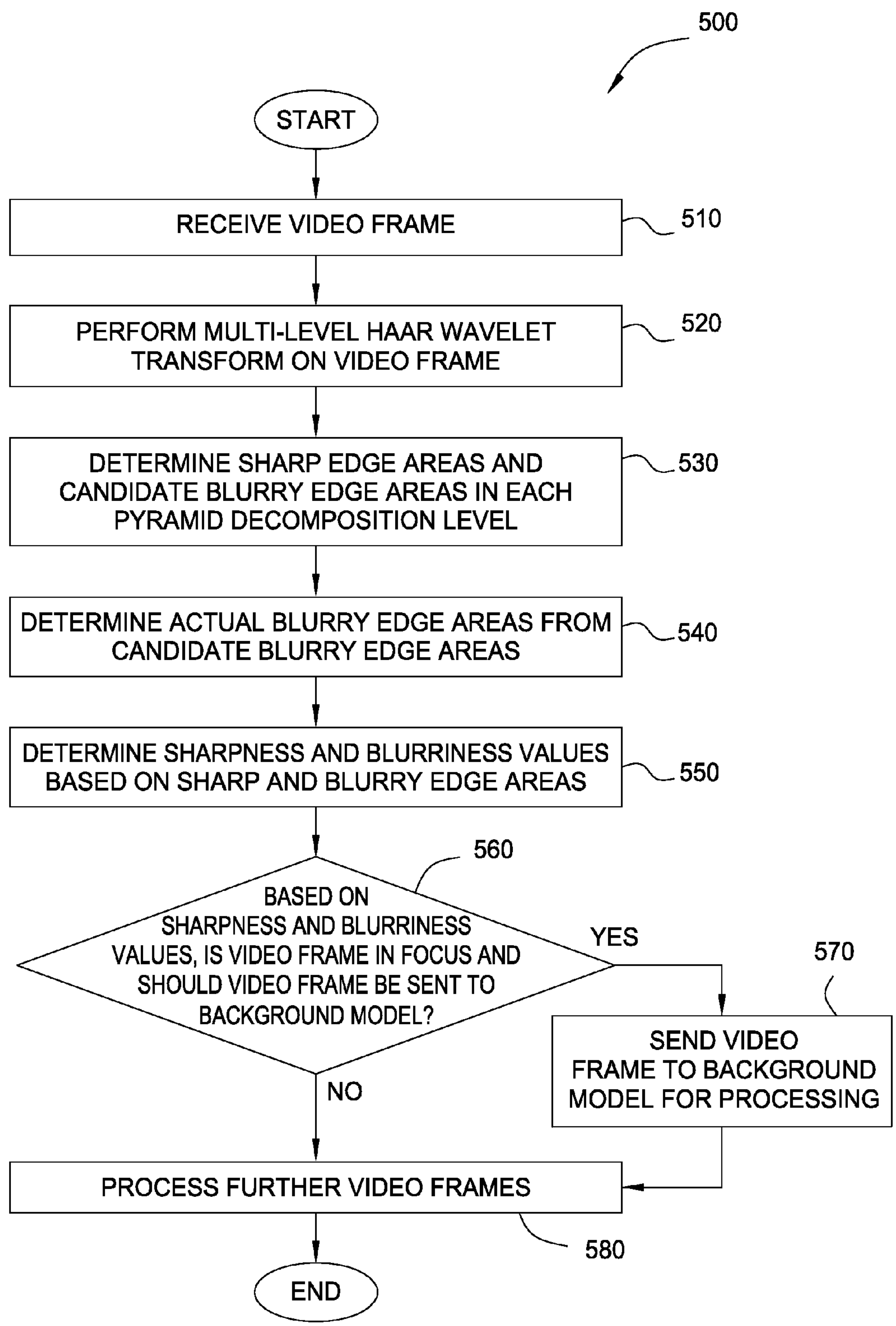
FIG. 5 illustrates a method for detecting and responding to out-of-focus video frames in a video analysis system, according to one embodiment of the invention.

FIG. 5 illustrates a method 500 for detecting and responding to out-of-focus video frames in a video analysis system, according to one embodiment of the invention. At step 510, a preprocessor receives a video frame from a video input source (e.g., a camera, web-cam device, VCR, or the like). At step 520, the preprocessor performs a multi-level (e.g., three-level) Haar wavelet transform on the received video frame. As discussed, applying the Haar wavelet transform separates the video frame's details according to their orientation (e.g., vertical orientation detail is separated from horizontal orientation detail).

At step 530, the preprocessor determines sharp edge areas and candidate blur edge areas in each level of the pyramid decomposition. As discussed, an edge area is an area of the video frame which includes an edge. For example, the video frame may simply be divided into a plurality of areas (e.g., boxes that are $2^{highest\,pyramid\,level} \times 2^{highest\,pyramid\,level}$ pixels in size), and those areas which include horizontal, vertical, or diagonal detail from the pyramid decomposition may be considered edge areas.

In one embodiment, the preprocessing component may classify an edge area as "sharp" (i.e., having edge(s) with a Dirac or Astep structure) when the maximum of the wavelet coefficient(s) for the edge(s) in the area are larger at lower pyramid decomposition levels. By contrast, the preprocessing component may classify edge areas as candidate blur edge areas (i.e., having edge(s) with a roof or Gstep structure) when the maximum of the wavelet coefficient(s) for the edge(s) in the area are smaller at lower pyramid decomposition levels.

At step 540, the preprocessor determines a set of actual blurry edge areas from the candidate blurry edge areas. In one embodiment, the preprocessor may classify an edge area as actually "blurry" if at higher pyramid decomposition levels the area includes blurry edge(s) and there are no sharp edge(s) in the area at the first decomposition level. As discussed, edges which appear in some, but not all, decomposition levels may be spurious. As a result, even if there are sharp edges in an edge area at high decomposition levels, if those sharp edge(s) are not present at the first decomposition level, the preprocessor may ignore the edges as spurious. By contrast, if higher pyramid decomposition levels (and the first decomposition level) include an edge (e.g., a blurry edge), the edge is unlikely to be spurious.

In one embodiment, "blurry" edges may include edges having roof and Gstep structures, while "sharp" edges may include edges having Dirac and Astep structures. In such a case, the preprocessor may determine a type of structure for each of the edges of the pyramid decomposition images. Further, the preprocessor may classify an edge area as actually "blurry" if at higher pyramid decomposition levels the area includes edge(s) having roof and/or Gstep structure(s) and there are no edge(s) in the area having Dirac and/or Astep structures at the first decomposition level.

At step 550, the preprocessor determines a sharpness value and a blurriness value based on the sharp and blur edge areas determined in steps 530-540. The sharpness value may indicate an overall (degree of) sharpness of the video frame, while the blurriness value may indicate an overall (degree of) blurriness of the video frame.

In one embodiment, the preprocessor may determine a sharpness value for the video frame based on the ratio of sharp edge areas to overall edge areas:

$$S = \frac{\text{Number of Sharp Edge Areas}}{\text{Total Edge Areas}} \tag{1}$$

Further, the preprocessor may determine a blurriness value for the video frame based on a ratio of the actual blurry edge areas to candidate blurry areas:

$$B = \frac{\text{Number of Actual Blurry Areas}}{\text{Number of Candidate Blurry Areas}} \quad (2)$$

At step 560, the preprocessor determines, based on the sharpness and blurriness values, whether the video frame is in focus and whether the video frame should be sent to the BG/FG component. In one embodiment, the preprocessor may determine that the video frame is out of focus and the video frame should not be sent to the BG/FG component if:

(blurriness>BLUR_LEVEL__3) AND (sharpness<SHARP_LEVEL__3) OR (blurriness>BLUR_LEVEL__2) AND (sharpness<SHARP_LEVEL__2) OR (blurriness>BLUR_LEVEL__1) AND (sharpness<SHARP_LEVEL__1), (3)

where BLUR_LEVEL__3>BLUR_LEVEL__2>BLUR_LEVEL__1, and SHARP_LEVEL__3>SHARP_LEVEL__2>SHARP_LEVEL__1. Here, BLUR_LEVEL__1, BLUR_LEVEL__2, and BLUR_LEVEL__3 may be predefined blurriness thresholds, with BLUR_LEVEL__3 being the mostly blurry. At the same time, SHARP_LEVEL__1, SHARP_LEVEL__2, and SHARP_LEVEL__3 may be predefined sharpness thresholds, with SHARP_LEVEL__3 being the most sharp. For example, a video frame satisfying the condition that (blurriness>BLUR_LEVEL__3) AND (sharpness<SHARP_LEVEL__3) may have a high blurriness value and not a high sharpness value, and the preprocessor may determine that such a video frame should not be sent to the BG/FG component because it is blurry. Illustratively, the values of BLUR_LEVEL__3, BLUR_LEVEL__2, and BLUR_LEVEL__1 may be taken to be 0.9, 0.8, and 0.5, respectively, while the values of SHARP_LEVEL__3, SHARP_LEVEL__2, and SHARP_LEVEL__1 may be taken to be 0.5, 0.2, and 0.1, respectively.

Advantageously, each condition evaluates to true only if the blurriness value and the sharpness value are consistent. For example, a high blurriness value and a high sharpness value for a given video frame would be inconsistent, and would not evaluate to true under any of the three conditions. By ensuring consistency between blurriness and sharpness values, false-positive out-of-focus determinations may be reduced.

If the preprocessor determines that the video frame should be sent to the BG/FG component, then, at step 570, the preprocessor sends the video frame to the BG/FG component for further processing. If the preprocessor determines that the video frame should not be sent to the BG/FG component, then the method 500 continues at step 580, where the preprocessor processes further video frames.

In one embodiment, the preprocessor may alert one or more components within the computer vision engine or the machine learning engine of the out-of-focus video frame. In response, computer vision engine and the machine learning engine may disregard the out-of-focus video frame for learning and analysis purposes even if the video frame is received.

In a further embodiment, the preprocessor may also issue alerts to a user interface, as appropriate. For example, the preprocessor may issue an alert if a given number of consecutive video frames are blurry, or if only blurry video frames are received over a given time duration. As a result, the user may be notified of the need to, for example, adjust the camera.

While the foregoing is directed to embodiments of the present invention, other and further embodiments of the invention may be devised without departing from the basic scope thereof, and the scope thereof is determined by the claims that follow.

What is claimed is:

1. A computer-implemented method for detecting a camera being out-of-focus, the method comprising:
- receiving a video frame;
- performing a pyramid image decomposition on the video frame, the pyramid image decomposition being performed using a multi-level wavelet transform;
- determining sharp edge areas, candidate blurry edge areas, and blurry edge areas in each level of the pyramid image decomposition, wherein the sharp edge areas are areas including edges with either a Dirac or an Astep structure;
- determining a sharpness value based on at least the sharp edge areas, the sharpness value indicating an overall sharpness of the video frame;
- determining a blurriness value based on at least the blurry edge areas and the candidate blurry edge areas, the blurriness value indicating an overall blurriness of the video frame; and
- determining, based on the sharpness value and the blurriness value, whether the video frame is out-of-focus.

2. The method of claim 1, wherein the sharpness value is determined as the ratio of a number of sharp edge areas to total edge areas, and wherein the blurriness value is determined as a ratio of a number of blurry edge areas to candidate blurry edge areas.

3. The method of claim 1, further comprising:
- upon determining the video frame is not out-of-focus, sending the video frame to a computer vision engine,
- wherein the computer vision engine is configured to analyze video frames captured by the camera and send data and provide an information stream to a machine learning engine, and
- wherein the machine learning engine is configured to learn patterns of behavior of objects in a scene based on at least data supplied by the computer vision engine.

4. The method of claim 3, wherein the camera is determined to not be in focus and the video frame is not sent to the computer vision engine if:

(blurriness>BLUR_LEVEL__3) AND (sharpness<SHARP_LEVEL__3) OR (blurriness>BLUR_LEVEL__2) AND (sharpness<SHARP_LEVEL__2) OR (blurriness>BLUR_LEVEL__1) AND (sharpness<SHARP_LEVEL__1), where BLUR_LEVEL__3>BLUR_LEVEL__2>BLUR_LEVEL__1, and SHARP_LEVEL__3>SHARP_LEVEL__2>SHARP_LEVEL__1.

5. The method of claim 1, further comprising, issuing an alert to a user interface if one or more received frames are determined to be out-of-focus.

6. The method of claim 1, wherein the candidate blurry edge areas are areas including edges with either a roof or a Gstep structure.

7. The method of claim 1, wherein the blurry edge areas are areas which do not include sharp edges in a first level of the pyramid image decomposition and which include blurry edges at one or more higher levels of the pyramid image decomposition.

8. The method of claim 1, wherein the sharp edge areas, the candidate blurry edge areas, and the blurry edge areas are each square or rectangular areas in the received video frames.

9. A non-transitory computer-readable storage medium storing instructions, which when executed by a computer system, perform operations for detecting a camera being out-of-focus, the operations comprising:

receiving a video frame;

performing a pyramid image decomposition on the video frame, the pyramid image decomposition being performed using a multi-level wavelet transform;

determining sharp edge areas, candidate blurry edge areas, and blurry edge areas in each level of the pyramid image decomposition, wherein the sharp edge areas are areas including edges with either a Dirac or an Astep structure;

determining a sharpness value based on at least the sharp edge areas, the sharpness value indicating an overall sharpness of the video frame;

determining a blurriness value based on at least the blurry edge areas and the candidate blurry edge areas, the blurriness value indicating an overall blurriness of the video frame; and determining, based on the sharpness value and the blurriness value, whether the video frame is out-of-focus.

10. The computer-readable storage medium of claim 9, wherein the sharpness value is determined as the ratio of a number of sharp edge areas to total edge areas, and wherein the blurriness value is determined as a ratio of a number of blurry edge areas to candidate blurry edge areas.

11. The computer-readable storage medium of claim 9, the operations further comprising:

upon determining the video frame is not out-of-focus, sending the video frame to a computer vision engine, wherein the computer vision engine is configured to analyze video frames captured by the camera and send data and provide an information stream to a machine learning engine, and wherein the machine learning engine is configured to learn patterns of behavior of objects in a scene based on at least data supplied by the computer vision engine.

12. The computer-readable storage medium of claim 11, wherein the camera is determined to not be in focus and the video frame is not sent to the computer vision engine if:

(blurriness>BLUR_LEVEL__3) AND (sharpness<SHARP_LEVEL__3) OR (blurriness>BLUR_LEVEL__2) AND (sharpness<SHARP_LEVEL__2) OR (blurriness>BLUR_LEVEL__1) AND (sharpness<SHARP_LEVEL__1), where BLUR_LEVEL__3>BLUR_LEVEL__2>BLUR_LEVEL__1, and SHARP_LEVEL__3>SHARP_LEVEL__2>SHARP_LEVEL__1.

13. The computer-readable storage medium of claim 9, the operations further comprising, issuing an alert to a user interface if one or more received frames are determined to be out-of-focus.

14. The computer-readable storage medium of claim 9, wherein the candidate blurry edge areas are areas including edges with roof or Gstep structures.

15. The computer-readable storage medium of claim 9, wherein the blurry edge areas are areas which do not include sharp edges in a first level of the pyramid image decomposition and which include blurry edges at one or more high levels of the pyramid image decomposition.

16. The computer-readable storage medium of claim 9, wherein the sharp edge areas, the candidate blurry edge areas, and the blurry edge areas are each square or rectangular areas in the received video frames.

17. A system, comprising:

a processor; and a memory, wherein the memory includes an application program configured to perform operations for detecting a camera being out-of-focus, the operations comprising:

receiving a video frame, performing a pyramid image decomposition on the video frame, the pyramid image decomposition being performed using a multi-level wavelet transform, determining sharp edge areas, candidate blurry edge areas, and blurry edge areas in each level of the pyramid image decomposition, wherein the sharp edge areas are areas including edges with either a Dirac or an Astep structure, determining a sharpness value based on at least the sharp edge areas, the sharpness value indicating an overall sharpness of the video frame, determining a blurriness value based on at least the blurry edge areas and the candidate blurry edge areas, the blurriness value indicating an overall blurriness of the video frame, and determining, based on the sharpness value and the blurriness value, whether the video frame is out-of-focus.

* * * * *